Patented Jan. 26, 1943

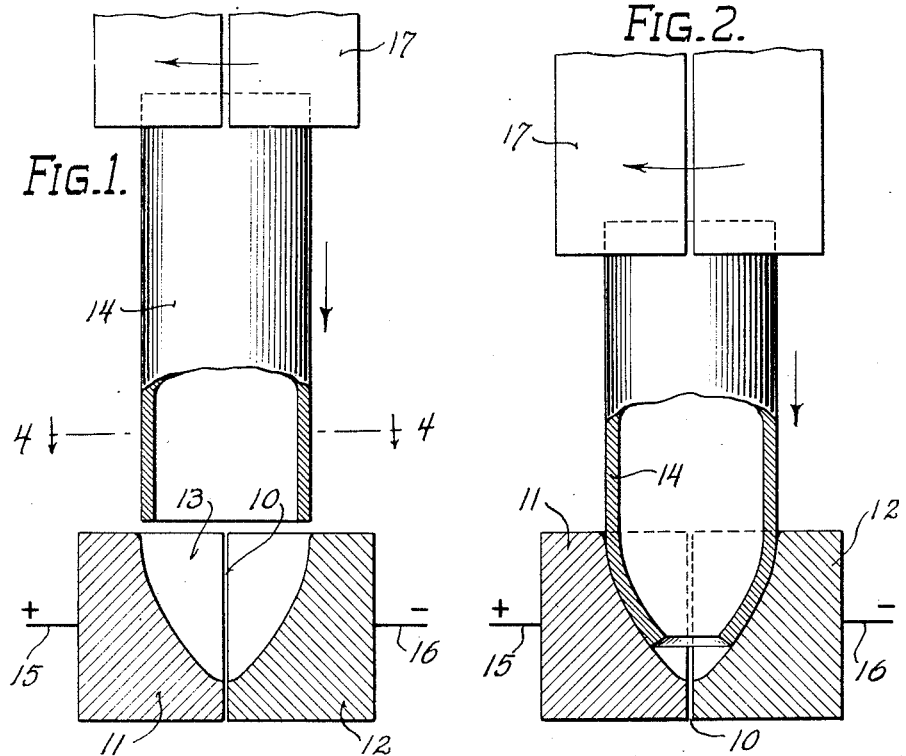
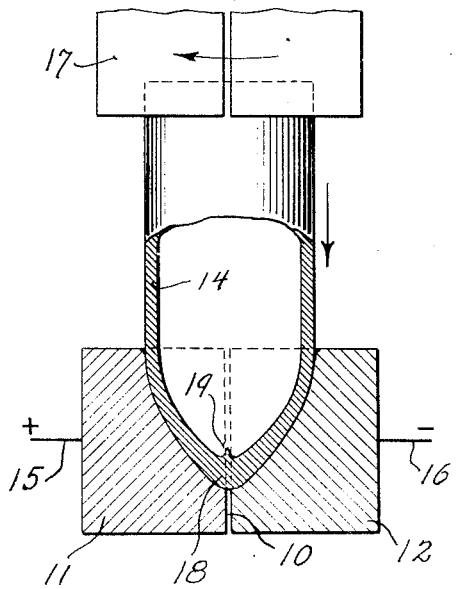
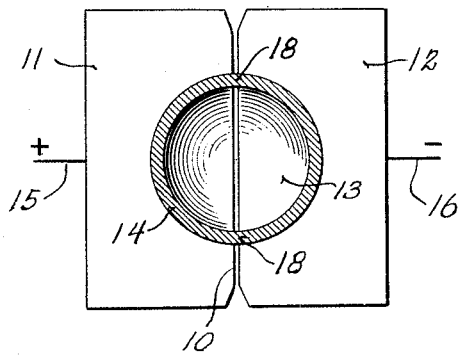

2,309,561

UNITED STATES PATENT OFFICE 2,309,561

METHOD OF TREATING METALLIC BODIES

Sven Westin and Axel Westin, West Allis, Wis., assignors of one-third to Charles Greenblatt, Milwaukee, Wis.

Application January 30, 1941, Serial No. 376,669

18 Claims. (Cl. 219—3)

This invention relates to an improved method and means for treating metallic bodies and particularly tubular or other hollow bodies.

It is quite common in the treatment of metallic bodies to heat the same by passing an electric current therethrough. For instance, that method of treating, commonly known as resistance heating, constitutes the very essence of the extensively used resistance welding process. Attempts have also been made to utilize resistance heating as an aid in various forming processes, such as drawing, spinning, bending, etc., but, as heretofore carried out, such applications of resistance heating have not proven entirely satisfactory.

One object of the present invention is to provide an improved method and means for utilizing resistance heating in various forming processes.

Another object is to provide an improved method and means for utilizing resistance heating in combined forming and welding processes.

Other objects and advantages will appear from the following description of a method exemplifying the present invention.

For purposes of illustration and explanation we have herein illustrated and described a novel method of closing and welding the ends of tubular bodies although the invention is applicable to various other metal forming, welding, and combined forming and welding processes.

In the accompanying drawing:

Figures 1, 2 and 3 are views partly in section and partly in elevation illustrating successive stages of a method of closing and welding the end of a tubular body in accordance with the present invention.

Fig. 4 is a horizontal sectional view taken along the line 4—4 of Fig. 1.

The method selected for illustration involves the use of a multi-part forming tool or die whose parts function not only as forming members but also as electrodes for the transmission of electricity through that portion of the work piece with which they are engaged, the parts being insulated from one another and suitably connected to an appropriate source of electrical energy for the purpose last mentioned.

The die shown comprises a metallic block vertically split through its center, as indicated at 10, to provide two sections 11 and 12 insulated from each other by an air gap or other appropriate insulating material within the split 10. The two sections of the die are suitably fashioned so that they together form a substantially circular vertically tapered forming cavity 13 adapted to receive and to contract the open end of a tubular work piece 14 as the latter is forced lengthwise thereinto. The cavity 13 is symmetrically disposed with respect to the split 10.

The separated sections 11 and 12 of the die are respectively connected to the opposite sides of an electric circuit, as indicated by the lines 15 and 16, so that they function as positive and negative electrodes.

The tubular work piece 14 is forced lengthwise into the die cavity 13 by appropriate means, including a suitable chuck or clamp 17 which is also rotated during its advance to effect rotation of the work piece within the cavity.

In carrying out the method, as soon as the work piece 14 contacts both die sections 11 and 12 it closes the circuit therebetween and the heat resulting from the current passing therethrough softens the material of the work piece and thereby facilitates the forming process. The heating effect is concentrated in those narrow zones 18 of the work piece which bridge the gap 10 between the die sections, but due to the relative rotation between the work piece and die these zones travel about the work piece and thus effect distribution of the heat around the walls thereof.

That portion of the work piece within the die cavity thus continues to be heated as it advances and, during its rotating advance, it is contracted by the curved converging walls of the cavity, as indicated in Fig. 2. As this contraction progresses, the arcs of travel between the localized heating zones 18 become progressively shorter and consequently the heating effect becomes more intense. This continues until the end of the tubular work piece reaches the bottom of the cavity and is closed thereby, as indicated in Fig. 3. It will be noted that the point of closure occurs within the axis of rotation of the work piece where it is continuously subject to the intensive heat developed within the concentrated heat zone 18. The temperature attained at this point is sufficient for welding purposes, and the pressure at this point, resulting from continued momentary advance of the work piece, causes the heated metal to flow inwardly from the welded joint, as indicated by the protrusion 19, carrying with it any oxides or other impurities that might have been present on the end of the work piece. This results in a solid weld free from fissures and impurities.

As indicated in Fig. 3, the described process produces a hollow body perfectly symmetrical with respect to its axis and having a closed tapered end, the wall of the tapered end being somewhat thicker than that of the original tubular blank. These physical characteristics are highly desirable in shells for bombs and other ammunition. The particular shape of the formed end may of course be varied by varying the shape of the die or by subsequent forming operations, and the interior contour may be varied and controlled by the use of an appropriate internal plunger or core.

Various changes may be made in the method and apparatus hereinabove specifically described without departing from or sacrificing the advantages of the invention as defined in the appended claims.

We claim:

1. The method of treating metallic bodies comprising applying pressure contact between a body and a multi-part forming means while relatively moving said body and means to effect re-current engagement between the several parts of said means and successive portions of said body to be formed, and simultaneously passing a heating current of electricity through portions of said body from one part of said forming means to another.

2. An improved forming method which includes producing relative rotation and shaping pressure between a metal blank and forming means, and simultaneously passing a heating current of electricity through said blank from one part of said forming means to another part thereof.

3. An improved forming method which includes producing relative rotation and shaping pressure between an end of a tubular blank and a forming means, and simultaneously passing a heating current of electricity through the end portion of said blank which is subjected to the shaping action of said forming means, from one part of said forming means to another part thereof.

4. An improved forming method which includes producing relative rotation and shaping pressure between an end portion of a tubular blank and a circumferentially separated multipart forming means to contract and close said end portion, and simultaneously passing a heating current of electricity through said end portion of said blank circumferentially from one part of said forming means to another part thereof to facilitate the contraction thereof and to weld the same at the point of closure.

5. An improved forming method which includes producing relative rotation and shaping pressure between the end portion of a tubular blank and a plurality of oppositely charged radially opposed electrode forming dies to contract, close and weld said end portion.

6. An improved forming method which includes producing relative rotation and shaping pressure between a hollow blank and a plurality of oppositely charged radially opposed electrode forming dies to simultaneously heat and shape said blank.

7. A forming apparatus comprising a forming means having a plurality of radially opposed insulated die sections connected to opposite sides of an electric circuit, and means for effecting relative rotation and shaping pressure between a metal blank and said die sections.

8. An apparatus of the class described comprising a plurality of electrodes constituting forming tools connected to different terminals of a source of electric current, means simultaneously pressing said electrodes into engagement with a body to be formed, and means for relatively moving said electrodes and body to effect re-current engagement between the same over successive adjacent portions of the body to progressively heat and form the same.

9. A forming apparatus comprising a forming means having at least two circumferentially separated die sections, means for connecting said sections to different terminals of an electric circuit, and means for effecting relative rotation and shaping pressure between a metal blank and said die sections.

10. In a forming apparatus the combination of a forming means having at least two separated sections cooperating to provide a forming cavity, means for connecting said sections to different terminals of an electric circuit, and means for effecting relative rotation and advance of a metal blank into said cavity to heat and simultaneously shape said blank.

11. In a forming apparatus the combination of a forming means comprising a plurality of circumferentially separated members cooperating to form a substantially cup-shaped cavity and symmetrically disposed with respect to the axis of said cavity, means for connecting said members to different terminals of an electric circuit, and means for effecting relative rotation and lengthwise advance of a tubular metal blank into said cavity to form the end of said blank.

12. The method of treating a metallic body, comprising applying forming pressure to a plurality of opposed areas in the region of forming of the body, transferring said forming pressure to successive adjacent areas of the body in recurrent cycles, and simultaneously applying heat to successive adjacent areas of said body between the areas of pressure application, to progressively heat and shape said body.

13. The method of treating metallic bodies comprising applying shaping pressure to a body by a plurality of electrode dies which cooperate to supply a resistance heating current to the body, and relatively rotating said body and said dies.

14. An apparatus of the class described comprising a plurality of electrodes constituting forming tools disposed symmetrically about an axis and circumferentially separated from one another to provide a substantially circular forming surface, means for feeding a tubular blank exially parallel to the axis of said forming surface into pressure contact with said electrodes, and means connecting said electrodes to a source of electric current to pass resistance heating current through the blank between the electrodes to thereby soften the blank and facilitate forming of the same under the axial pressure applied thereto.

15. An apparatus of the class described comprising a plurality of electrodes constituting forming tools disposed symmetrically about an axis and circumferentially separated from one another to provide a substantially circular forming surface, means for feeding a tubular blank axially parallel to the axis of said forming surface into pressure contact with said electrodes, means connecting said electrodes to a source of electric current to pass a resistance heating current through the blank between the electrodes to thereby soften the blank and facilitate forming of the same under the axial pressure applied thereto, and means to relatively rotate said electrodes and blank on the axis of said forming surface to repeatedly subject successive adjacent circumferential portions of the blank to the heating current and forming pressure.

16. An apparatus of the class described comprising a plurality of electrodes constituting forming tools disposed symmetrically about an axis and circumferentially separated from one another to provide a substantially circular forming surface, means for feeding a metal blank into pressure contact with said electrodes, means connecting said electrodes to a source of electric current to pass resistance heating current through the blank between the electrodes to thereby soften the blank and facilitate forming of the same under the pressure applied thereto, and means to relatively rotate said electrodes and blank to repeatedly subject successive adjacent circumferential portions of the blank to the heating current and forming pressure.

17. An apparatus of the class described comprising a plurality of cooperating forming tools circumferentially arranged around a blank to be electrically heated and formed, means to effect relative rotation between said blank and tools in pressure contact with each other, and means to pass a heating current through said blank from one of said tools to another of said tools.

18. An apparatus of the class described comprising means to rotate a tubular blank to be formed, a relatively stationary forming tool engaging said blank in the region of forming and constituting an electrode for supplying a heating current to the blank, and a stationary electrode engaging the blank to provide the return circuit for the heating current.

SVEN WESTIN.
AXEL WESTIN.